United States Patent [19]
Foo

[11] Patent Number: 5,943,308
[45] Date of Patent: Aug. 24, 1999

[54] PORTABLE COMPACT DISK OPEN/HOLD ACTUATOR BUTTON

[75] Inventor: Lum Chee Foo, Penang, Malaysia

[73] Assignee: Sony Electronics (M) Sdn. Bhd., Penang, Malaysia

[21] Appl. No.: 08/852,178

[22] Filed: May 6, 1997

[30]     Foreign Application Priority Data

May 10, 1996 [MY]    Malaysia .......................... PI 960 1771

[51] Int. Cl.⁶ .................................................. G11B 33/00
[52] U.S. Cl. ............................................................ 369/75.1
[58] Field of Search ................................. 369/75.1, 75.2, 369/292; 360/97.01, 137; 312/9.4, 9.41, 9.42; 206/470

[56]                 References Cited

U.S. PATENT DOCUMENTS

| | | | |
|---|---|---|---|
| 4,811,314 | 3/1989 | Alves | 369/75.1 X |
| 4,815,066 | 3/1989 | Horvath | 369/75.2 X |
| 5,065,004 | 11/1991 | Mizuno et al. | 369/75.1 X |
| 5,341,357 | 8/1994 | Mukawa et al. | 369/75.2 |

*Primary Examiner*—William R. Korzuch
*Attorney, Agent, or Firm*—Frommer Lawrence & Haug, LLP.; William S. Frommer

[57]                    ABSTRACT

An improved actuator button having components integrated therein which permit the single button to be operated in two distinct and mutually exclusive modes with each of the modes achieving respective separate functions. The improved actuator button advantageously incorporates a 'press down' mode and a 'slide' mode, which achieve separate functions with each operation of the modes. The features of the improved actuator button have general application in the manufacturing of electrical and electronic products. In particular, the improved actuator button has useful application in portable compact disk players (CD players) wherein the exclusively press mode operation of the actuator achieves the 'open' function by opening the protective cover of the CD player, while the exclusively 'slide' mode operation of the actuator achieves the 'hold' function by preventing interruption of the currently played CD program.

8 Claims, 4 Drawing Sheets

PORTABLE COMPACT DISK OPEN/HOLD ACTUATOR BUTTON

FIELD OF THE INVENTION

This invention relates to an improved single actuator button capable of being operated in two distinct and mutually exclusive modes which perform separate functions respectively. The single actuator button of the present invention incorporates a 'press down' mode and a 'slide' mode, achieving separate functions with each operation of the modes. The actuator button of the present invention has general application in the manufacturing of electrical and electronic products.

In particular, the actuator button of the present invention can be utilized in conjunction with portable compact disk players (CD players), wherein the exclusively 'press down' mode operation of the actuator achieve the 'open function' by opening the protective cover of the CD players, while the exclusively 'slide' mode operation of the actuator achieves the 'hold' function by preventing the depression of any of the TAC buttons to cause accidental interruption of the currently playing CD program.

BACKGROUND OF THE INVENTION

In general, currently available portable compact disc players in the consumer marker are manufactured with separate 'open' and 'hold' function actuator buttons. However, in practice and in use it has been found that the use of two separate actuator buttons has a distinct disadvantage.

More specifically, when the 'open' mode of the actuator button is activated by depressing the button, the 'open' function is achieved by opening the already 'closed' protective cover of the portable CD player. The mechanism of the actuator button is configured entirely by mechanical means to release a catch that secures the protective cover in its closed position. The protective cover is advantageously spring loaded to automatically 'open' the cover upon release and is advantageously hinged to the chassis of the CD player. In the 'closed' position of the protective cover, the cover activates an electric switch that turns 'ON' or activates the electrical power to the entire portable CD player. In the 'open' position of the protective cover, the cover disables this electric switch, thus turning 'OFF' or deactivating electrical power to the entire CD player.

The 'hold' mode of the actuator button is activated by performing a 'slide' action wherein the actuator button is locked in this 'slide' position while an electrical switch is activated which electronically disables the use of all of the actuator buttons such as 'fast forward', 'fast reverse', 'play', etc. (the TAC buttons on the CD player. The 'hold' mode protects all of the TAC buttons of the CD player from causing any accidental interruption of the current playing CD program.

However, if for any reason, the 'open' actuator button is accidentally or deliberately operated during the period while the 'hold' mode is in operation or asserted, the 'open' actuator button releases the catch that secures the protective cover and when the cover reaches its open position, the electrical switch is activated that immediately turns 'OFF' the electrical power to the entire CD player. As a result the function of the 'hold' mode is overwritten thus defeating the purpose of the 'hold' mode.

In general, portable CD players are prone to accidental operation of the 'open' mode of the actuator button. In particular, if any such accidental operation occurred during the period the 'hold' actuator button is depressed, the CD program must be reset each time the protective cover is accidentally opened thereby causing the attendant inconveniences resulting therefrom.

The actuator button of the present invention aims to overcome the above limitations and shortcomings of the prior are by introducing features that enable the portable CD player to be operated such that accidental opening of the protective cover is eliminated when the 'hold' actuator button is depressed.

OBJECTS OF THE INVENTION

Therefore, it is an object of the present invention to provide an improved actuator button for a compact disk player which avoids the aforementioned deficiencies of the prior art.

It is also an object of the present invention to provide a single actuator button which achieves two mutually exclusives modes of operations (an exclusive 'OR' arrangement) integrated therein.

It is another object of the present invention to provide a single actuator button for a compact disk player where in when the actuator button is operated in the 'press down' mode, the 'slide' mode is disabled and at the same time an associated function is achieved (i.e., opening the cover);

It is further an object of the present invention to provide an actuator button for a compact disk player wherein when the actuator is operated in the 'slide' mode, the 'press down' mode is disabled and at the same time associated function is achieved (i.e., all TAC buttons disabled).

Various other objects, advantages and features of the present invention will become readily apparent from the ensuing detailed description and novel features will be particularly pointed out in the appended claims.

SUMMARY OF THE INVENTION

The above general objectives when applied to portable CD players may be characterized as follows:

The present invention relates to a single actuator button with improved mechanisms that integrates two mutually exclusives modes of operations (i.e., the 'open' or 'hold' modes), thus replacing the use of two separate actuator buttons.

The exclusively 'press down' or depressed operation of the actuator button achieves the 'open' function or mode enabling the protective cover to be opened.

The exclusively 'slide' operation of the actuator button disables or locks out the 'press down' operation and at the same time achieves the 'hold' function by electronically disabling all other functions of the other actuator buttons, such as 'fast forward', 'fast reverse', 'play' etc.

With the actuator button of the present invention, the intended function of the 'hold' mode can in fact be attained thus eliminating accidental opening of the protective cover which thereby causes the consequent inconvenience of setting or resetting a CD program.

BRIEF DESCRIPTION OF DRAWINGS

The following detailed description, given by way of example, by not intended to limit the invention solely to the specific embodiments described, may best be understood in conjunction with the accompanying drawings in which:

FIG. 3a is an elevational view of the actuator button of the present invention taken along line A—A of FIG. 2a.

FIG. 3b is an elevational view of the actuator button of the present invention taken along line A—A of FIG. 2b.

DETAILED DESCRIPTION OF CERTAIN PREFERRED EMBODIMENTS OF THE INVENTION

As completely as is able to be illustrated in 2 dimensional drawings, the figures attached hereto attempt to illustrate the actuator button of the present invention which is an intricately complex 3-dimensional object formed of four parts when fully assembled. Therefore, for case of understanding the features described, the figures with cut surfaces of the four component parts are suitably and consistently shaded throughout the sets of drawings so that the interrelationships between the features from the separate components may be easily perceived and understood. Further, the system of numbering employed in identifying the features of a component is as follows: the digit on the extreme left identifies the main component part to which it relates and the digit or digits that follow identify the specific features of that main component part.

Figure 1:
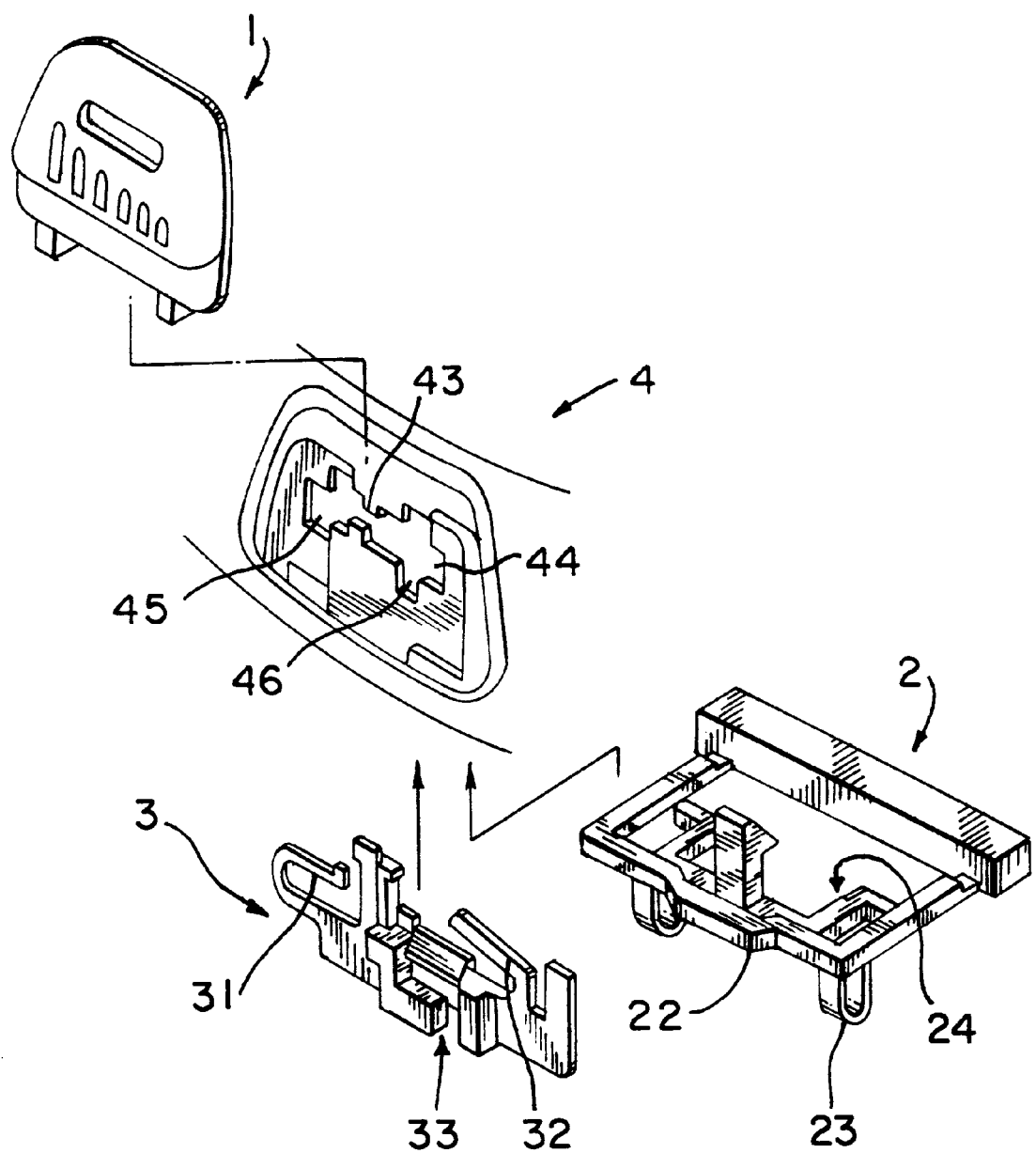
FIG. 1 is an exploded view of a preferred embodiment of an improved actuator button in accordance with the teachings of the present invention as applied to a portable CD player.

As is shown in FIG. 1, the actuator button of the present invention includes four components parts; open/hold cap (1), open-level frame (2), slide-lever (3), and actuator-chassis (4). It should be noted that as applied to a CD player, cap (1) is referred to as an open/hold cap (1), however, in the general application of this feature, it may be referred to as an actuator cap (1). The open-level frame (2) forms the means for securing/releasing the protective cover (5) of the CD player {see FIG. 2a}. The slide-lever (3) illustrated, achieves the 'hold' mode of operating the CD player. The actuator-chassis (4) includes the molded features in the general chassis of the CD player (the general chassis of the CD player is not fully shown). The open/hold cap (1) is secured to the actuator-chassis (4) at the front thereof while the open-lever frame (2) and the slide-lever (3) are secured on the reverse side of the actuator-chassis (4) which is located within the general chassis of the CD player. The individual component parts (i.e., the open/hold cap (1), open-level frame (2), the slide-lever (3) and actuator-chassis (4)) are manufactured as integrally molded parts to fit with one another in the fully assembly actuator button.

Figure 2A:
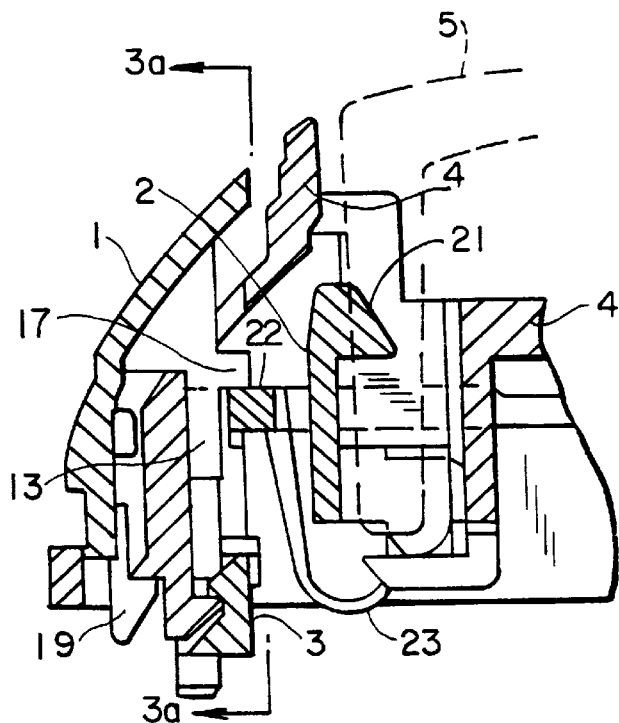
FIG. 2a is a cross-sectional elevational view of the actuator button in FIG. 1 fully assembled and shown in the unoperated mode.
Figure 2B:
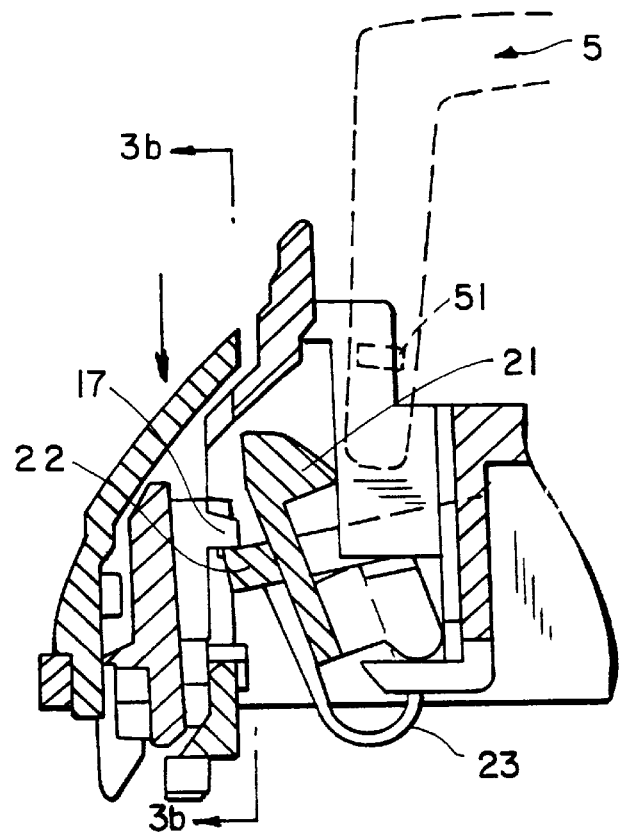
FIG. 2b is a cross-sectional elevation view of the actuator button of FIG. 1 fully assembled in the 'press down' ode.
Figure 3:
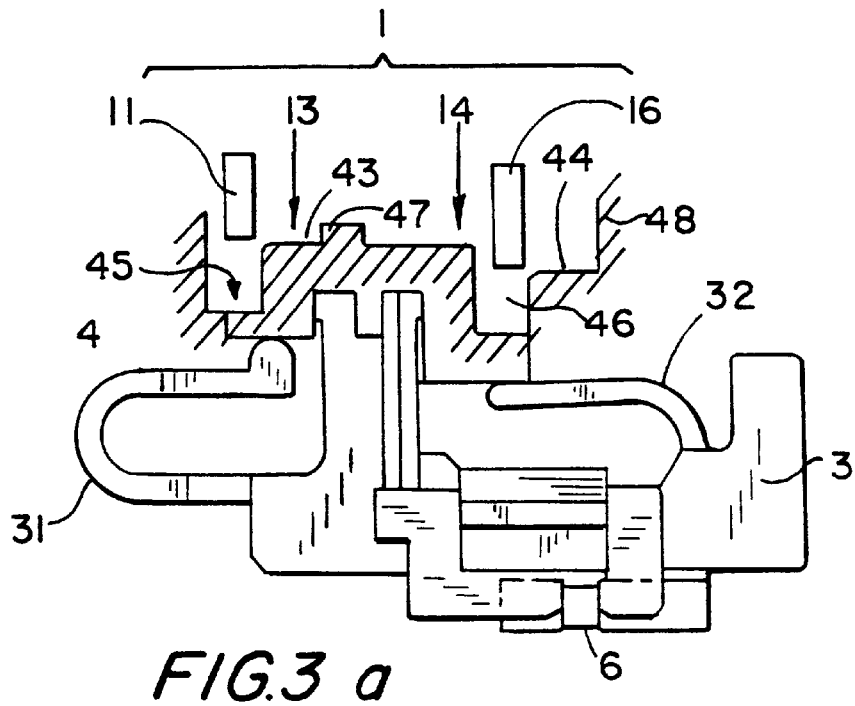
Figure 3:
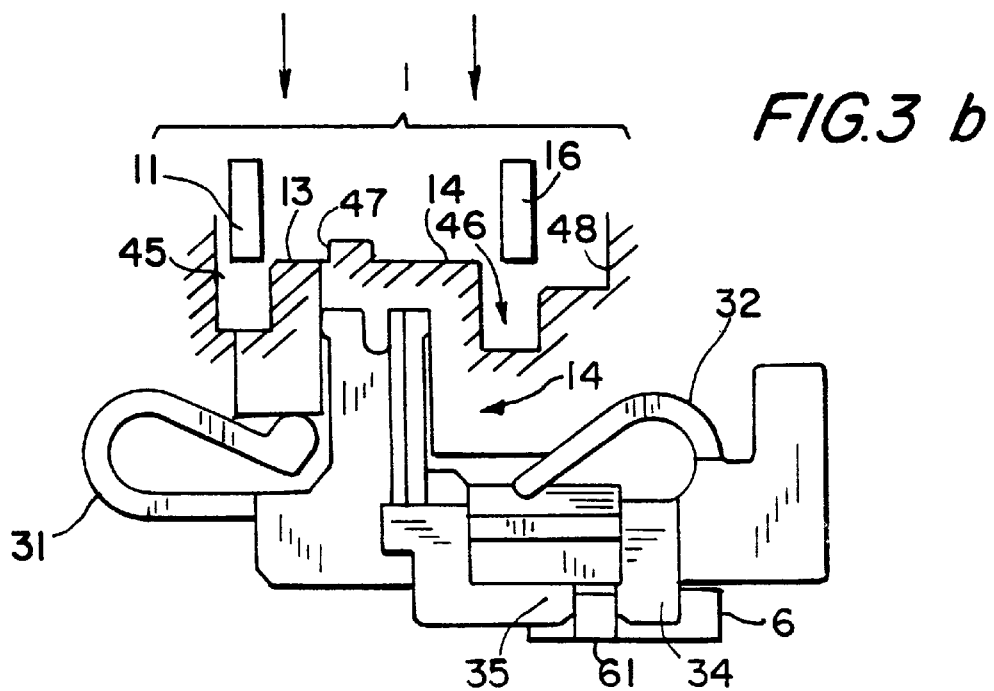

Referring now to FIGS. 2a and 3a, the fully assembled actuator button mechanism is shown in its unoperative mode with cut-out sections of the component parts. As best seen in FIG. 2b, on the reverse side of the open/hold cap (1), there are two vertically placed members (13) and (14). On each of the vertically placed members (13) and (14), respective open-ribs (17) and (18) are provided {for convenience only the open-ribs (17) is shown on member (13) in drawing 2a, while the other is not shown}. The open-ribs (17) and (18) rest on an open-bar (22) of the open-level frame (2). The bottom edge of the vertical members (13) and (14) respectively lightly apply tension to molded springs (31) and (32) of the slide-level (3), thus ensuring that there is no slack or gap therebetween. On the reverse side of the open/hold cap (1), slide-ribs (11) and (16) are provided and the two slide-ribs are aligned respectively directly over recesses (45) and (46) formed in the actuator chassis (4).

As shown in FIG. 2a, catches (19) slidingly secure the open/hold cap (1) with respect to the actuator chassis (4). For convenience, only one of the catches 19 has been illustrated in the figures. A catch frame (24) is integrally connected to the open-level frame (2) by means of two molded springs (23) {seen more clearly in FIG. 1}. The open bar (22) of the catch frame (24) carries the catch (21) which extends therefrom. The described assembly of the open-lever frame (2) enables the catch frame (24) to be rocked or rotated about the molded springs (23). For convenience only, the protective cover (5) of the CD player is shown in dotted lines in FIGS. 2a and 2b. The protective cover (5) has a catch-hole (51) into which the catch (21) of the open-level frame (2) fits in when the protective cover (5) is in its closed position.

The protective cover (5) is spring loaded and is hinged to the chassis of the CD player. In the open position of the protective cover (5), the electrical power supply of the entire CD player is disabled by means of a switch.

The slide-lever (3) is shaped so as to be secured to the open/hold cap (1) such that whenever the open/hold (1) is operated to slide, the slide-lever slides as well in the same direction by the same distance {for convenience the securing means are not shown in the drawings}. A recess (33) is provided between extension members (35) and (34) into which the nose (61) of the slide switch (6) is fitted. In this position, the slide switch (6) permits the use of function of all of the other TAC buttons of the CD player. The slide switch (6) is firmly secured to the general chassis of the CD player.

The details of the actuator chassis (4) are illustrated in FIG. 1. As shown therein, the actuator chassis (4) includes recesses (45) and (46) for receiving the slide-ribs (11) and (16) when the actuator button is in the 'press down' mode. The actuator chassis (4) further includes ridges (43) and (44) which are provided such that when the open/hold cap (1) is operated in the 'slide' mode, the slide-ribs (11) and (16) slide over the ridges (43) and (44) until mechanically stopped by end-ridges (47) and (48). Therefore, the ridges (43) and (44) inhibit the 'press down' mode when the 'slide' mode is in operation, thus, achieving one of the general objects of the present invention.

The operation of the actuator button of the present invention will now be explained.

Referring now to FIGS. 2b and 3b, to achieve the 'open' function of the protective cover (5) of the CD player, the open/hold cap (1) is operated from its original position by pressing it vertically down in the direction of the thick arrow in the FIG. 2b and FIG. 3b. The open/hold cap (1) can be pressed downwardly because the slide-ribs (11) and (16) are aligned directly over the recesses (45) and (46) of the actuator chassis (4) thus enabling the slide-ribs to slip into the recesses (45) and (46). Once the slide-ribs (11) and (16) are positioned within the recesses (45) and (46), it is no longer possible to perform the 'slide' mode until the open/hold cap (1) is released and returned to its original position. More specifically, the 'slide' mode is inhibited by the engagement of the slide-ribs (11) and (16) in the respective recesses (45) and (46). Thus, the 'press down' mode is achieved while the 'slide' mode of operation is concurrently prevented.

As a consequence of the 'press down' operation, the open ribs (17) and (18) bear upon the open-bar (22), sufficiently rotating or rocking the catch (21) of the catch frame (24) out of the catch-hole (51), thereby releasing the spring loaded protective cover (5) to automatically open the same. Further the button edge of the vertically placed members (13) and (14) of the open/hold cap (1) distort or compress the molded springs (31) and (32) of the slide-lever (3) into a state of increased tension. Upon release of the downward pressure upon the open/hold cap (1), the open/hold cap (1) automatically returns to its original position. This automatic return is made possible because of the combined action of the molded springs (31), (32) and (23) being released from a state of tension thereby retracting the open/hold cap (1) to its original position. Thus, the opening function of the protective cover of the CD player is achieved by the mode of pressing down or depressing the improved actuator button.

Figure 4:
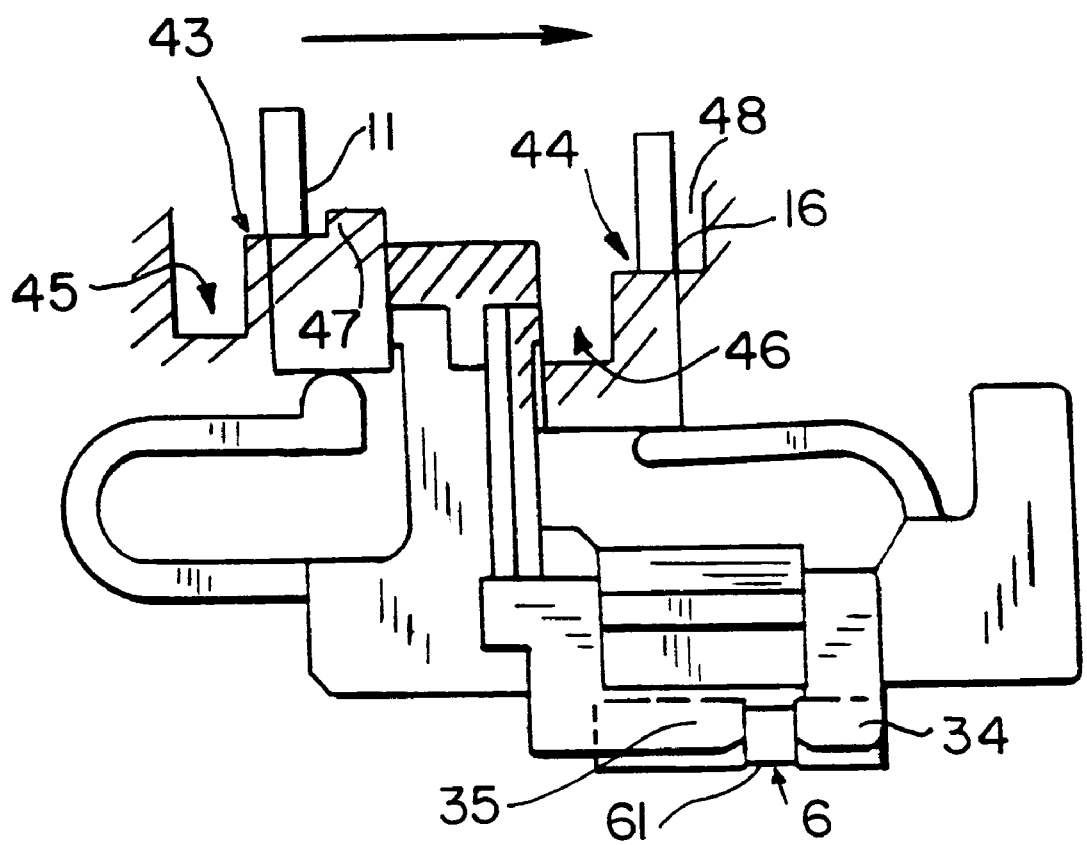
FIG. 4 is an elevational view of the actuator button of the present invention taken along line A—A of FIGS. 2a and 2b when the actuator button is in its 'slide mode'.

Referring now to FIGS. 2a, 3a and 4 for a better understanding, to achieve the 'hold' function of the actuator button the present invention, the open/hold cap (1) is operated from its original position this time by sliding the open/hold cap (1) in the horizontal direction designated by the thick arrow in FIG. 4 until the open/hold cap (1) reaches its mechanical stop. In this mode or operation, the slide-ribs (11) and (16) of the open/hold cap (1) slide over the respective ridges (43) and (44) on the actuator chassis (4) until the end slide ribs (11) and (16) reach the end ridges (47) and (48). Consequently, the open/hold cap (1) is disabled from being operated in the 'press down' mode as the 'press down' mode is locked out or disabled. Thus it is no longer possible to accidentally open the protective cover (5) when the CD player is operated in the 'hold' mode.

Further, as was explained above the slide-lever (3) is secured to slide in conjunction with the open/hold cap (1). Moreover, the nose (61) of the slide switch (6) secured in the recesses formed between members (34) and (35), is similarly made to slide and activate the slide switch so as to achieve the consequent function of electronically disabling all of the TAC actuators of the CD player. In order to accomplish this result, the actuator button of the present invention does not include any springs to slide the open/hold cap (1) back to its original position. Thus, it remains in this locked position until the operator deliberately slides the open/hold cap (1) to its original position.

The combined actions of disabling the 'open' mode and achieving the 'hold' function ensures greater security in the 'hold' mode of operating a CD player, thus effectively achieving one of general objects of the invention.

The applicant claims all simple or trivial modifications to the improved actuator button that may be reasonably regarded as obvious to a person skilled in the art.

For example, the described components which are generally made of molded plastic may, in part or whole, be made out of a suitable metal. Although reference is made to ribs, members, recesses, ridges in quantities of two, without prejudice to the invention the features may be made singly or in plurality.

Therefore, although the invention has been particularly shown and described with reference to certain preferred embodiments, it will be readily appreciated to those of ordinary skill in the art that various changes and modifications may be made therein without departing from the spirit and scope of the invention. It is intended that the appended claims be interpreted as including the foregoing as well as various other such changes and modifications.

I claim:

1. A button mechanism that is integrated in a single actuator button for an electronic product having a protective cover to enable the button to be operated in a 'press down' mode, wherein the protective cover of the electronic product is opened, and a 'slide' mode, wherein the protective cover is disabled from opening, said button mechanism comprising an actuator cap movable between said 'press down' mode and said 'slide' mode and having a pair of slide-ribs extending therefrom, an open-lever frame providing means for securing/releasing the protective cover, a slide-lever secured to the actuator cap to slide therewith, and an actuator chassis having a pair of chassis recesses formed therein and a pair of ridges, wherein said actuator cap, said open-lever frame, said slide-lever and said actuator chassis are integrally formed and wherein when said slide-ribs of said actuator cap are retained by said chassis recesses, sliding of said actuator cap is prevented and wherein when said actuator cap is moved to said 'slide' mode, said slide-ribs ride over said ridges prohibiting said actuator cap from achieving said 'press down' mode.

2. A button mechanism according to claim 1 wherein the button mechanism is in a compact disc player.

3. The button mechanism according to claim 2 wherein the actuator chassis includes end-ridges restricting further movement of said actuator cap in said 'slide' mode.

4. A button mechanism according to claim 2 wherein the actuator cap has a pair of vertically extending members having open-ribs which rest upon an open bar of said open-lever frame, said pair of vertical members lightly applying tension to first spring means of said slide lever.

5. A button mechanism according to claim 4 wherein a catch frame is integrally formed with respect to the open-lever frame by means of second spring means with said open bar of said open-lever frame having a catch extending therefrom, said open lever frame being thus formed to enable said catch frame to be rotated about said second spring means.

6. A button mechanism according to claim 4 wherein the slide-lever is secured to the actuator cap with said first spring means and said slide lever further includes retention members of said slide lever thereby forming a catch nose recess.

7. A button mechanism according to claim 6 wherein a catch nose of a sliding switch can be fitted within said catch nose recess of said slide-lever.

8. An audio set incorporating a button mechanism according to claim 1.

* * * * *